US006804665B2

(12) United States Patent
Kreulen et al.

(10) Patent No.: US 6,804,665 B2
(45) Date of Patent: Oct. 12, 2004

(54) METHOD AND APPARATUS FOR DISCOVERING KNOWLEDGE GAPS BETWEEN PROBLEMS AND SOLUTIONS IN TEXT DATABASES

(75) Inventors: Jeffrey Thomas Kreulen, San Jose, CA (US); Michael A. Lamb, New Paltz, NY (US); William Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 09/836,200

(22) Filed: Apr. 18, 2001

(65) Prior Publication Data

US 2002/0169783 A1 Nov. 14, 2002

(51) Int. Cl.[7] .............................................. G06F 17/00
(52) U.S. Cl. .............................. 707/3; 707/104; 707/1
(58) Field of Search ........................... 707/3, 7, 104.1; 706/45, 46

(56) References Cited

U.S. PATENT DOCUMENTS

| 5,371,673 | A | | 12/1994 | Fan ........................ 364/419.01 |
| 5,701,400 | A | * | 12/1997 | Amado ........................ 706/45 |
| 5,754,939 | A | * | 5/1998 | Herz et al. ................ 715/501.1 |
| 5,835,900 | A | * | 11/1998 | Fagg et al. ..................... 706/11 |
| 5,857,179 | A | | 1/1999 | Vaithyanathan et al. ........ 707/2 |
| 5,909,679 | A | * | 6/1999 | Hall .............................. 707/4 |
| 5,974,412 | A | | 10/1999 | Hazlehurst et al. ............ 707/3 |
| 6,014,658 | A | * | 1/2000 | Pretz ............................. 707/2 |
| 6,026,396 | A | * | 2/2000 | Hall .............................. 707/4 |
| 6,263,333 | B1 | * | 7/2001 | Houchin et al. ................ 707/5 |
| 6,321,192 | B1 | * | 11/2001 | Houchin et al. ................ 704/9 |
| 6,336,029 | B1 | * | 1/2002 | Ho et al. ..................... 706/927 |
| 6,370,542 | B1 | * | 4/2002 | Kenyon .................. 707/103 R |
| 6,446,061 | B1 | * | 9/2002 | Doerre et al. .................. 707/3 |
| 6,480,698 | B2 | * | 11/2002 | Ho et al. ..................... 706/927 |
| 6,484,155 | B1 | * | 11/2002 | Kiss et al. ..................... 706/46 |
| 6,499,024 | B1 | * | 12/2002 | Stier et al. .................... 706/50 |
| 6,571,236 | B1 | * | 5/2003 | Ruppelt .......................... 707/3 |
| 6,587,847 | B1 | * | 7/2003 | Stier et al. .................... 706/50 |
| 6,598,054 | B2 | * | 7/2003 | Schuetze et al. ........ 707/103 R |
| 6,636,862 | B2 | * | 10/2003 | Lundahl et al. ............. 707/101 |
| 6,675,159 | B1 | * | 1/2004 | Lin et al. ........................ 707/3 |
| 2002/0065845 | A1 | * | 5/2002 | Naito et al. ............. 707/500.1 |
| 2002/0107858 | A1 | * | 8/2002 | Lundahl et al. ............. 707/100 |
| 2002/0156763 | A1 | * | 10/2002 | Marchisio ....................... 707/1 |

FOREIGN PATENT DOCUMENTS

| CA | 2324755 A1 | * | 6/2001 | ........... G06F/17/30 |
| JP | 8-221439 | | 8/1996 | |
| JP | 11-110409 | | 4/1999 | |

* cited by examiner

*Primary Examiner*—Kim Vu
*Assistant Examiner*—Monplaisir Hamilton
(74) *Attorney, Agent, or Firm*—Leonard Guzman, Esq.; McGinn & Gibb, PLLC

(57) ABSTRACT

A method (and system) of determining a knowledge gap between a first database containing a set of problems records and a second database containing solutions documents, includes developing a set of clusters of the problems records of the first database, where each cluster has a centroid, developing a dictionary having entries based on the problems records in the first database, developing a vector space correlated to the solutions documents in the second database, where the vector space is based on the dictionary entries, developing a listing of distances between the cluster centroids and the vector space, and determining a knowledge gap for each cluster.

15 Claims, 4 Drawing Sheets

METHOD AND APPARATUS FOR DISCOVERING KNOWLEDGE GAPS BETWEEN PROBLEMS AND SOLUTIONS IN TEXT DATABASES

BACKGROUND OF THE INVENTION

1. Field of the Invention

The present invention generally relates to a method of analyzing contents of two electronic databases, typically in text form, as a form of data mining. Specifically, a first database contains data on problems and a second database contains data on solutions. A method is presented to discover knowledge gaps wherein, for problems in the first database, there is missing an appropriate corresponding solution in the second database.

2. Description of the Related Art

A typical example of electronic databases assisting in solving real world problems is a scenario involving the helpdesk operator. Human helpdesk operation is very labor intensive and therefore expensive. Consequently, automation of helpdesk problem solving represents a key objective for providers of electronic customer services.

For a typical conventional system, a "free form" computer helpdesk data sets consist primarily of short text descriptions, composed by the helpdesk operator for the purpose of summarizing what problem a user had and what was done by the helpdesk operator to solve the problem. A typical text document (known as a problem ticket) from this data set consists of a series of exchanges between an end user and an expert helpdesk advisor, for example:

1836853 User calling in with WORD BASIC error when opening files in word. Had user delete NORMAL.DOT and had her reenter Word. She was fine at that point. 00:04:17 ducar May 2:07:05:656PM Such problem tickets may be comprised only of a symptom and resolution pair as in the above example, or they may span multiple questions, symptoms, answers, attempted fixes, and resolutions-all pertaining to the same basic issue. Problem tickets are opened when the user makes the first call to the helpdesk and closed when all user problems documented in the first call are finally resolved in some way. Helpdesk operators enter problem tickets directly into the database. Spelling, grammar, and punctuation are inconsistent. The style is terse and the vocabulary is very specialized. Such problem tickets are normally saved in some kind of data base which maintains a record of all user interactions/help desk operator interactions over a given time period. This record is referred to as a "helpdesk log".

In addition to a log of problem tickets, most helpdesk support units have some repository of solutions that document how to solve the most commonly occurring problems. In the present application, this repository of solutions is referred to as a "Solutions Knowledge Base" (SKB). While the implementation of an SKB may vary, at their most fundamental level they most often consist of a set of electronic text documents, each of which solves one or more specific user problems.

The problem that this invention addresses is that of rapidly discovering the areas or categories of problems in the help desk logs that are not well represented in the Solutions Knowledge Base. In the present application, such areas of poor representation are referred to as "knowledge gaps". The more rapidly and accurately these knowledge gaps are discovered, the better that engineering or other resources can be applied to write new solutions that will have the most beneficial impact.

Past approaches to finding knowledge gaps relied primarily on expert, comprehensive knowledge of both the problem space and the Solution Knowledge Base, or else a manual perusal of text documents in the helpdesk log and the SKB. The first approach relies too heavily on scarce expert resources while the second is impractical for large helpdesk logs and SKBs.

SUMMARY OF THE INVENTION

In view of the foregoing and other problems, it is, therefore, an object of the present invention to provide a structure and method for discovering and isolating knowledge gaps between two databases.

It is another object of the present invention to provide a method of discovering a class of documents that are most unlike a known set of document classes.

It is yet another object of the present invention to provide a method of determining where to best apply resources for finding solutions to problems.

It is yet another object of the present invention to provide a method to cross correlate two databases in a way that identifies possible content deficiencies in one of the two databases.

It is yet another object of the present invention to provide a method of improving knowledge base quality.

It is yet another object of the present invention to decrease the cost of knowledge base maintenance.

A main idea of this invention is to analyze, data mine, and summarize the text data sets of problem reports (problem tickets) using an automated unsupervised clustering algorithm in concert with a human data analyst. A goal is to discover those classes of problem tickets that are not well represented in a set of solution documents.

Generally, with the invention, one solution to the above problems is based on the following procedure, which has been successfully implemented in a computer program. In this description it is assumed that an initial helpdesk log text data set, i.e., a problem database P, and a solution knowledge base text data set S have been developed. To identify knowledge gaps, the following steps are executed:

1. Identify a dictionary D of frequently-used words in the problems database P.
2. Count the occurrences of dictionary words in documents of the problems database P.
3. Develop a set of problems categories C in problems database P.
4. For solutions database S, generate a new vector space model, by counting occurrences of the words in D in each document in S.
5. Calculate the distance between every document in S and the mean (centroid) of every problems category C
6. For each category Cj, find the distance of the nearest document in S. Call this the category gap score.
7. Sort the categories in order of decreasing gap score.
8. List the first N categories of the highest gap scores.

Although the following discussion continues with the example of a helpdesk operation, this is only one of various possibilities. For example, other organizations that could benefit from this invention might include an airline maintenance organization or an automotive workshop. A Patent Office could use it to develop and routinely update patent categories, based on correlating a database of issued patents and/or pending applications with a database containing patent categories. A customer service organization or sales organization could use it by setting up a first database to document sales requests or customer complaints and a second database to document the solutions ultimately resolving the request or complaint. Similarly, an organization developing a maintenance manual or a procedures manual could use this method to identify and address gaps in their coverage, either as an initial pre-release screening or as part of a routine update process.

In a first aspect of the present invention, a method of determining knowledge gaps between a first database P containing a set of problems records and a second database S containing solutions documents is disclosed, including developing a set of clusters of the problems records of the first database P, each cluster having a centroid, developing a dictionary D having entries based on lexicographical patterns in the problems records in the first database P, developing a vector space correlated to the solutions documents in the second database S, where the vector space is based on the dictionary D entries, developing a listing of distances between the cluster centroids and the vector space, and determining a knowledge gap for each cluster, where the knowledge gap is defined as the minimum distance in the listing.

In a second aspect of the present invention, an apparatus for discovering a class of documents most unlike a known set of document classes is disclosed, including a computer having at least one CPU, a first database P containing a set of problems records and accessible to the computer, and a second database S containing solutions documents also accessible to the computer, wherein the computer contains a program providing instructions described above.

In a third aspect of the present invention, a system for determining knowledge gaps between a first database P containing a set of problems records and a second database S containing solutions documents is disclosed, including a computer having at least one CPU, a first database P containing a set of problems records accessible to the computer, and a second database S containing solutions documents accessible to the computer, wherein the computer contains a program providing instructions described above.

In a fourth aspect of the present invention, a signal-bearing medium is provided that tangibly embodies a program of machine-readable instructions executable by a digital processing apparatus to perform the above-mentioned method of discovering knowledge gaps between a first database P containing a set of problems records and a second database S containing solutions documents.

With the unique and unobvious aspects of the invention, it is possible in any general information retrieval problem to discover a class of documents that are most unlike a known set of document classes. The invention also provide an improvement in the knowledge base quality and a decreased cost of knowledge base maintenance.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
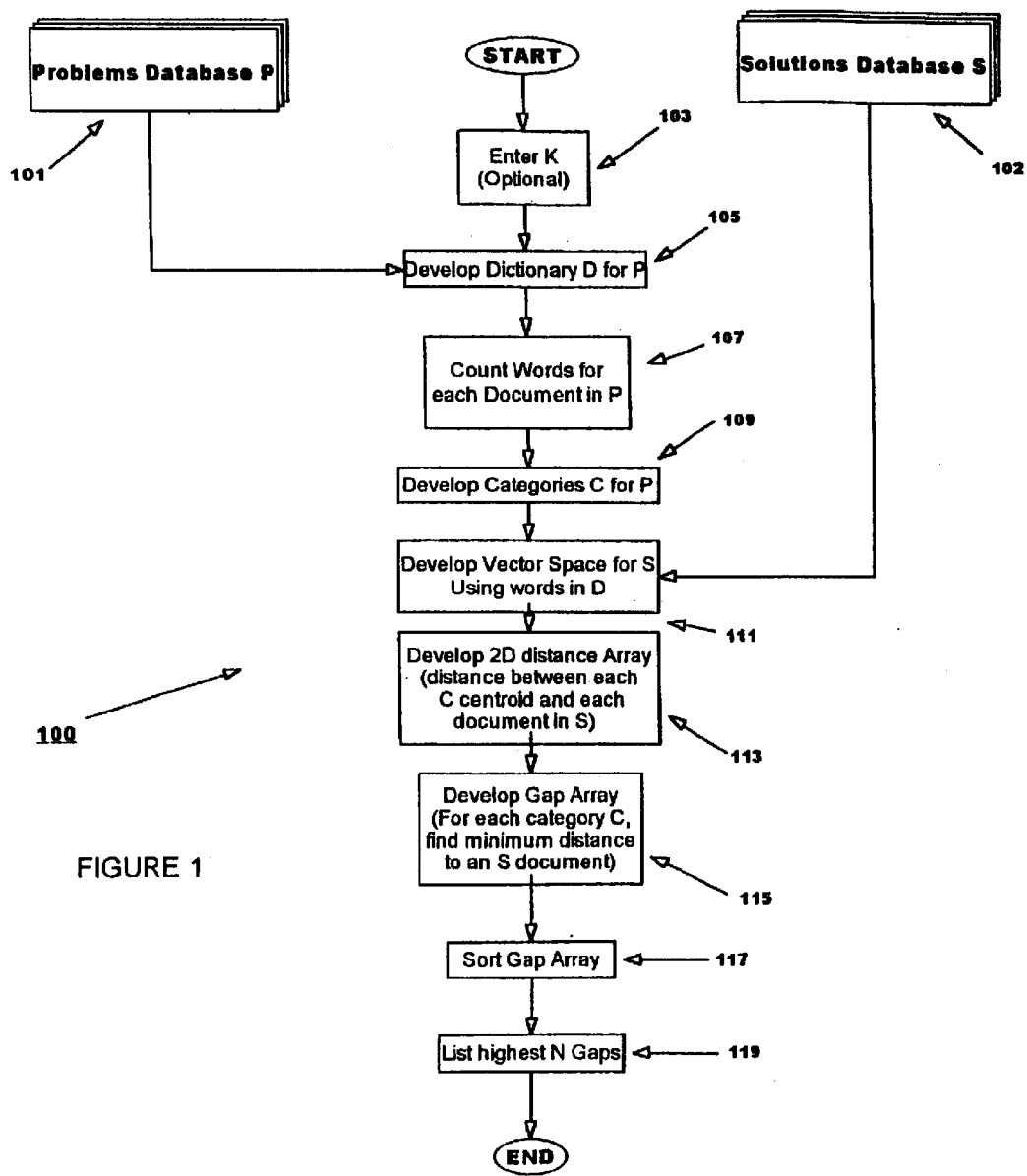
FIG. 1 is a flow diagram illustrating the basic concepts of the invention.

Referring now to the drawings, and more particularly to FIG. 1, a method 100 is discussed that generally presents the concept of this invention. This discussion assumes that the problems database P and the solutions database S have been entered into an electronic database 101, 102 and are available. Typically, this entry of the two databases would be an ongoing routine sequence that is automatically updated as problems or other information, depending upon the application, are reported and ultimately resolved.

The execution of this invention could be initiated by an operator or could be automatically initiated to periodically and routinely update the knowledge gaps. The technique involves a categorization of the P database, which can be done in any number of ways. One alternative is to have the database previously categorized into clusters, either manually or simply based on previous history where the routine updating assumes the same number of clusters as previously. If previously categorized, for example, the database structure includes some method of categorization. As an example, each problem report could include an entry prompt in which the operator responds to and thereby automatically places the new problem report into one or more pre-existing categories. This discussion for FIG. 1 assumes the problems database P already contains categorization information. However, should the database require categorization, an algorithm such as that discussed below for FIG. 3 can be used. An operator enters (step 103) the number of categories K and the software executes the algorithm to categorize the database into K clusters.

The next step is the development of a dictionary D of the frequently-used words for the problems database contents (step 105). Although this discussion uses the term "word" to describe the dictionary entries, it is not so limited. Depending upon the application, the dictionary might include text words, word phrases, or other symbology or lexicographic patterns appropriate for the application. Computer programs to develop a dictionary on database documents are well known in the art so details of this step are not included. Each word in the text data set is identified and the number of documents each word occurs in is counted. The most frequently occurring words in the corpus of the database compose a dictionary. A listing of stop words eliminates entries such as "and", "in", and "his" that convey little information in a dictionary composed essentially of topic words. In the example of the helpdesk, the result would include not only informative words but also proper names such as "Lotus" or "Bob". The former may be useful, especially for the automated clustering discussed later. The latter would be a distraction. The software as implemented for the present invention provides features for automatically locating proper names (via capitalization) and for manually refining the dictionary. A stemming algorithm is also used to combine all variants of a word into a single term (e.g., "print", "prints", "printer", "printed", "printing", etc.). The resultant reduced set of words will be used to compose a simple description of each document in the corpus of database P.

In step 107, the occurrences of dictionary words in documents of data set P is counted. The invention creates a matrix of non-negative integers where each column corresponds to a word in the dictionary and each row corresponds to an example in the text corpus, typically a document as defined by a problem report. The values in the matrix represent the number of times each dictionary word occurs in each example. Since most of these values will, under normal circumstances, be zero, this matrix is described as "sparse". This property of sparseness is used to greatly decrease the amount of storage required to hold the matrix in memory, while incurring only a small cost in retrieval speed.

This method relies on having problems database P categorized into a set of clusters K. Thus, if required, step 109 creates a cluster (i.e., partition) of the examples (documents) in problems data set P. The discussion later for FIG. 3 will discuss one simple way to achieve such categorization using the "k-means" clustering algorithm. However, any method of categorization is sufficient, including a simple operator sorting, although for large databases such manual methods are not desirable.

In the software implementation, each problem ticket is converted to a vector of floating point values by counting in each problem ticket the number of occurrences of each dictionary term. This integer vector is then normalized to have unit Euclidean norm. The distance used in the exemplarily implemented software is a cosine similarity metric. Thus, two points are considered identical if the cosine of the angle between them is one and considered most dissimilar if the cosine of this angle is zero.

In step 111, a new vector space model is generated for solutions text data set S by counting occurrences of the terms in dictionary D in each document in S. The result is a second sparse matrix which is developed that correlates the number of times each dictionary word in D occurs in each example of the solutions data set S.

The distance between each document in S and the mean (centroid) of every problem in category C is calculated in step 113. This result is saved in a two dimensional distance array. It is this distance array that becomes the basis of determining the information gaps in the solutions database S.

In step 115, for each category in C, the distance between the centroid and the nearest document in S is found. This minimal distance between the centroid and the nearest document in S is called the category gap score and is implemented by finding the minimum distance for each category in the distance array. These gap scores are then saved in a 1-dimensional array, called the gap array. Being a measurement of distance, this number represents how closely any category in P is affiliated with the closest solution in S. A sufficiently large gap score for a category suggests that inadequate solutions exist for that problem category.

To isolate possible problem categories, the two dimensional distance array resulting in step 113 above is sorted to arrange entries in an decreasing order (step 117). The highest gaps are at the top of the sort.

Figure 2:
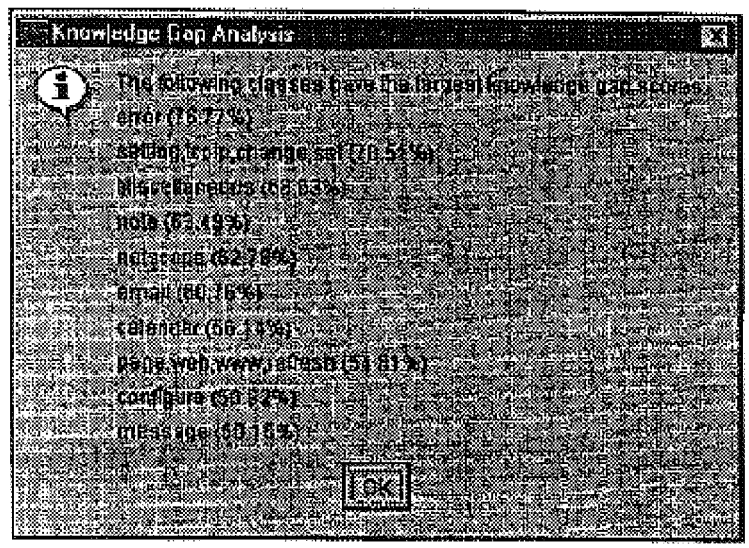
FIG. 2 is an actual resultant Knowledge Gap Analysis of the example discussed for explaining the basic concepts.

In step 119, the first N categories along with their gap scores are listed as a display output. In the example involving the helpdesk, the results are shown in FIG. 2, using N=10. This listing is the actual result for the problem used by the inventors to develop this invention as part of a project to improve helpdesk operations for the Assignee.

Figure 3:
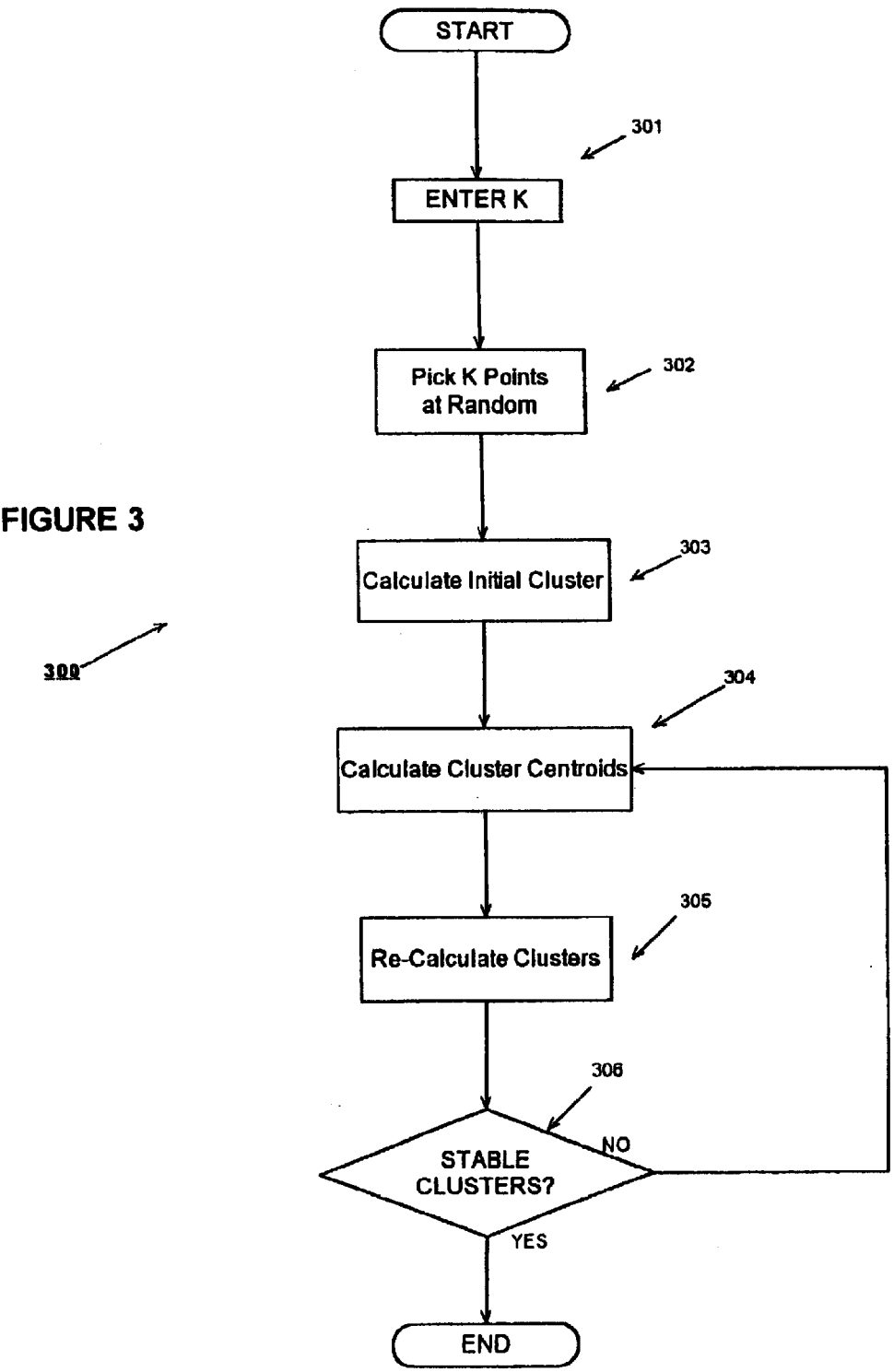
FIG. 3 is a flow diagram illustrating a preferred method of automatically categorizing the problem database into clusters.

The more realistic scenario involves a problems database that has not been categorized. FIG. 3 shows one method that could be used to automatically create clusters in the problems database P. Various other text clustering algorithms could be used (see, for example, Rasmussen, E., 1992, "Clustering Algorithms", in *Information Retrieval: Data Structures and Algorithms*, pp 419–442, Prentice Hall). The clustering algorithm "k-means" is one of the most popular procedures for automatic classification of data when no classification is known (Duda and Hart, 1973, *Pattern Classification and Scene Analysis*, Wiley). This algorithm is very fast and easy to implement.

The implementation of the k-means algorithm in this invention utilizes the cosine distance metric to determine the distance (d) between a centroid (x) and an example vector (y):

$$d(X, Y) = \frac{X \cdot Y}{\|X\| \cdot \|Y\|} \qquad \text{(Eqn. 1)}$$

As shown in the method 300 illustrated by FIG. 3, a user supplies input (step 301) for K, the number of clusters to produce. The algorithm will then pick K random points (step 302) and develop an initial set of clusters (step 303) around these K points. In step 304, the centroid of the resultant clusters is calculated, and based on these centroids, the elements are again categorized into K clusters based on distance from the centroids (step 305). This process of developing clusters, calculating new centroids, and developing new clusters is repeated (step 306) until the clusters are stable.

Figure 4:
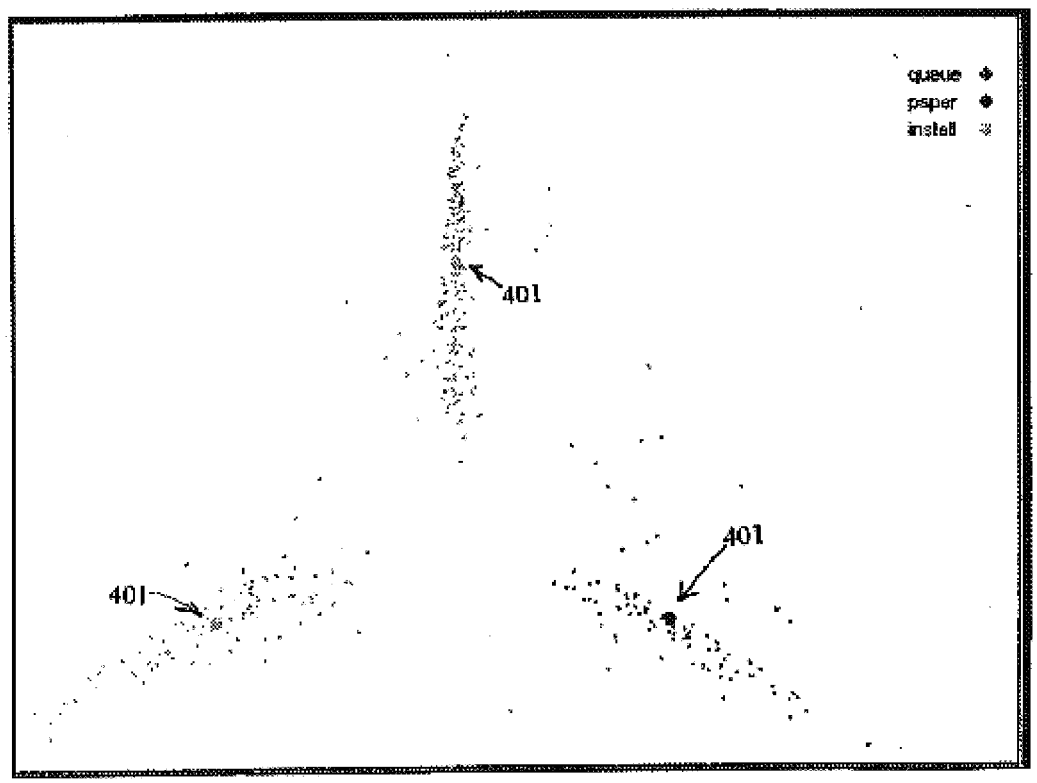
FIG. 4 is an example of the clusters resulting from the technique described by FIG. 3.

FIG. 4 shows a text clustering with K=3 on the database used in this example. The centroids 401 are indicated by the large circles and the individual examples are indicated by small dots. The software controlling the presentation causes the cluster members to be colored according to which cluster they belong.

Second Embodiment

A second embodiment of the invention considers that another important component in determining the gap between a cluster and a solution document is the cohesion of the cluster. The cohesion of a cluster, c, is calculated by a metric which is analogous to the standard deviation metric for random variables.

$$\text{cohesion } (c) = ((\Sigma_{x \in c} \cos(\text{centroid}(c), x))/|c|)^{1/2} \qquad \text{(Eqn. 2)}$$

The distance of each cluster in the problems set categorization from its corresponding most similar solution document divided by the cohesion of the cluster is calculated and stored as a g score.

$$g(c) = (\text{MAX}_{x \in solutions} (\cos(\text{centroid}(c), x)))/\text{cohesion}(c) \qquad \text{(Eqn. 3)}$$

Note that the maximum cosine distance to select the "most similar" document is used because cosine distance returns a value of 1.0 Float for identical documents and 0.0 Float for completely distinct documents. As the g-score increases, therefore, the likelihood of a matching solution document to the cluster to also increase is expected. A low g-score indicates that no matching solution document is present (thus, a low g-score indicates a large "knowledge gap"). Clusters with cohesion approaching 1.0 (e.g., those consisting of nearly identical documents) will require solution documents nearer their centroid to achieve the same g-score as clusters with less cohesion. This "correction" for cohesion is important when using the cosine distance metric to avoid the smallest g-score always corresponding to the cluster with the lowest cohesion since, generally, centroids from clusters with low cohesion tend not to match any particular document very exactly.

It should be pointed out for emphasis that the technique as modified to use the g-score results in a search for a maximum rather than a minimum.

Figure 5:
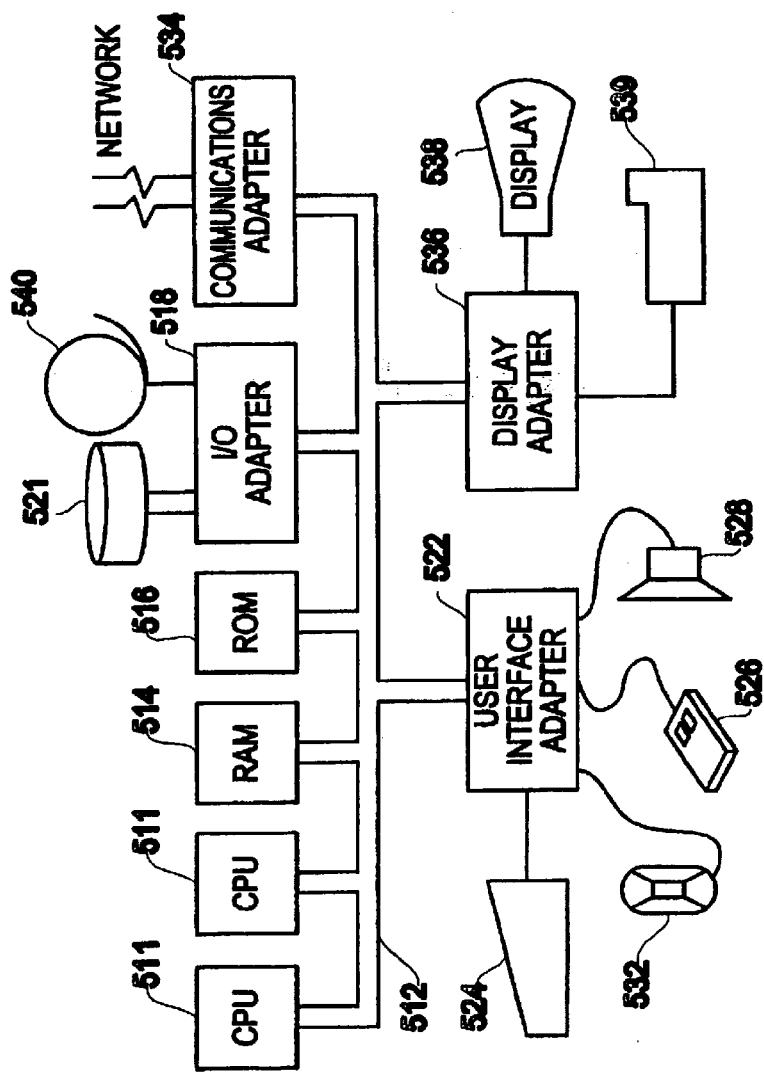
FIG. 5 illustrates an exemplary hardware/information handling system 500 for incorporating the present invention therein.

FIG. 5 illustrates a typical hardware configuration of an information handling/computer system for use with the invention and which preferably has at least one processor or central processing unit (CPU) 511.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer 539 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 511 and hardware above, to perform the method of the invention.

Figure 6:
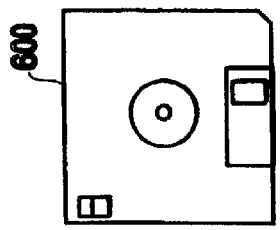
FIG. 6 illustrates a signal bearing medium 600 (e.g., storage medium) for storing steps of a program of a method according to the present invention.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Whether contained in the diskette 600, the computer/CPU 511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Although a number of practical uses for the invention has been identified in the above disclosure, a person of ordinary skill would recognize many others. For example, this approach could be used to filter search results on the web to return only those results that were not already known about. In this scenario, the web becomes the Problem data set P and the existing known documents become the Solutions set S. The algorithm then reveals the major classes of documents in P that have no corresponding known representative in S.

In general, this invention could be applied to any general information retrieval problem where it is desired to discover a class of documents that are most unlike a known set of document classes. Additional benefits of the invention include an improvement in the knowledge base quality and a decreased cost of knowledge base maintenance.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A computer-implemented method of determining a knowledge gap between a first database containing a set of problems records and a second database containing solutions documents, said method comprising:
   developing a set of clusters of said problems records of said first database, each said cluster having a centroid;
   developing a dictionary having entries based on said problems records in said first database;
   developing a vector space correlated to said solutions documents in said second database, said vector space being based on said dictionary entries;
   developing a listing of distances between said cluster centroids and said vector space; and
   determining a knowledge gap for each said cluster.

2. The method of claim 1, wherein said dictionary has entries based on a lexicographical pattern.

3. The method of claim 1, wherein said knowledge gap is defined as a minimum distance in said listing.

4. The method of claim 1, further comprising a sorting by size of said knowledge gaps and a display of a predetermined number of the highest knowledge gaps.

5. The method of claim 1, wherein said development of said set of clusters is achieved by an operator-assisted classification in which an operator classifies each said problems record into an appropriate one of a predetermined set of clusters, either when each of said problems records is initially entered into said first database or subsequent to initial entry but prior to executing said process for finding said knowledge gaps.

6. The method of claim 1, wherein said development of said set of clusters is achieved by an automatic process of classification that occurs either with or without entry by said operator of at least one parameter.

7. The method of claim 6, wherein said automatic process of classification comprises an entry by said operator of a parameter representing a number of clusters and execution of a "k-means" clustering algorithm.

8. The method of claim 1, wherein said determining of a knowledge gap for each said cluster further comprises incorporating a measure of cohesion of said cluster.

9. The method of claim 1, further comprising a calculation of each said cluster centroid.

10. An apparatus for discovering a class of documents most unlike a known set of document classes, said apparatus comprising:
   a computer;
   a first database containing a set of problems records, and being accessible by said computer; and
   a second database containing solutions documents, and being accessible by said computer,
   wherein said computer contains a program providing instructions comprising:
      developing a set of clusters of said problems records of said first database, each said cluster having a centroid;
      developing a dictionary having entries based on said problems records in said first database;

developing a vector space correlated to said solutions documents in said second database, said vector space being based on said dictionary entries;

developing a listing of distances between said cluster centroids and said vector space; and determining a knowledge gap for each said cluster.

11. The apparatus of claim 10, wherein said dictionary has entries based on a lexicographical pattern and said knowledge gap is defined as a minimum distance in said listing.

12. A system for determining knowledge gaps between a first database containing a set of problems records and a second database containing solutions documents, said system comprising:

a computer;

a first database containing a set of problems records, and being accessible by said computer; and a second database containing solutions documents, and being accessible by said computer, wherein said computer contains a program providing instructions comprising:

developing a set of clusters of said problems records of said first database, each said cluster having a centroid;

developing a dictionary having entries based on said problems records in said first database;

developing a vector space correlated to said solutions documents in said second database, said vector space being based on said dictionary entries;

developing a listing of distances between said cluster centroids and said vector space; and determining a knowledge gap for each said cluster.

13. A system for determining knowledge gaps between a first database containing a set of problems records and a second database containing solutions documents, said system comprising:

a first database containing a set of problems records, and being accessible by a computer;

a second database containing solutions documents, and being accessible by said computer;

means for developing a set of clusters of said problems records of said first database, each said cluster having a centroid;

means for developing a dictionary having entries based on said problems records in said first database;

means for developing a vector space correlated to said solutions documents in said second database, said vector space being based on said dictionary entries;

means for developing a listing of distances between said cluster centroids and said vector space; and means for determining a knowledge gap for each said cluster.

14. A system for determining a knowledge gap, comprising:

a first database containing a set of problems records, and being accessible by a computer;

a second database containing solutions documents, and being accessible by said computer;

a set of clusters of said problems records of said first database, each said cluster having a centroid;

a dictionary having entries based on said problems records in said first database;

a vector space correlated to said solutions documents in said second database, said vector space being based on said dictionary entries;

a listing of distances between said cluster centroids and said vector space; and a knowledge gap calculator for calculating a knowledge gap for each said cluster.

15. A signal-bearing medium tangibly embodying a program of machine-readable instructions executable by a digital processing apparatus to perform a method of determining a knowledge gap between a first database containing a set of problems records and a second database containing solutions documents, said method comprising:

developing a set of clusters of said problems records of said first database, each said cluster having a centroid;

developing a dictionary having entries based on said problems records in said first database;

developing a vector space correlated to said solutions documents in said second database, said vector space being based on said dictionary entries;

developing a listing of distances between said cluster centroids and said vector space; and determining a knowledge gap for each said cluster.

* * * * *